May 22, 1951     J. H. GRAYSON     2,553,575
SAFETY PILOT CONTROLLED THERMOSTATIC GAS COCK
Filed Feb. 18, 1946     2 Sheets-Sheet 1
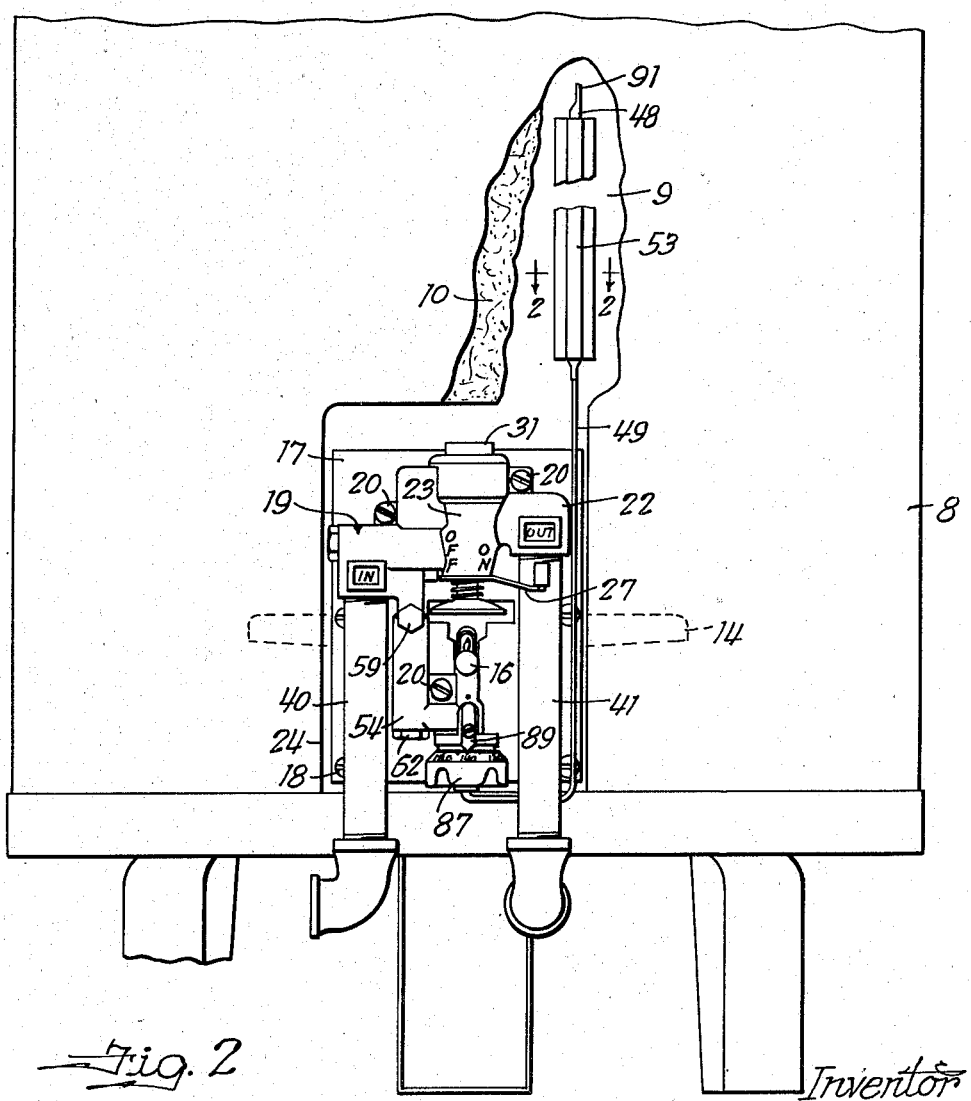
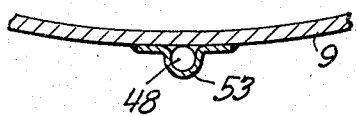
Inventor
John H. Grayson
Andrew F. Wintercorn
atty.

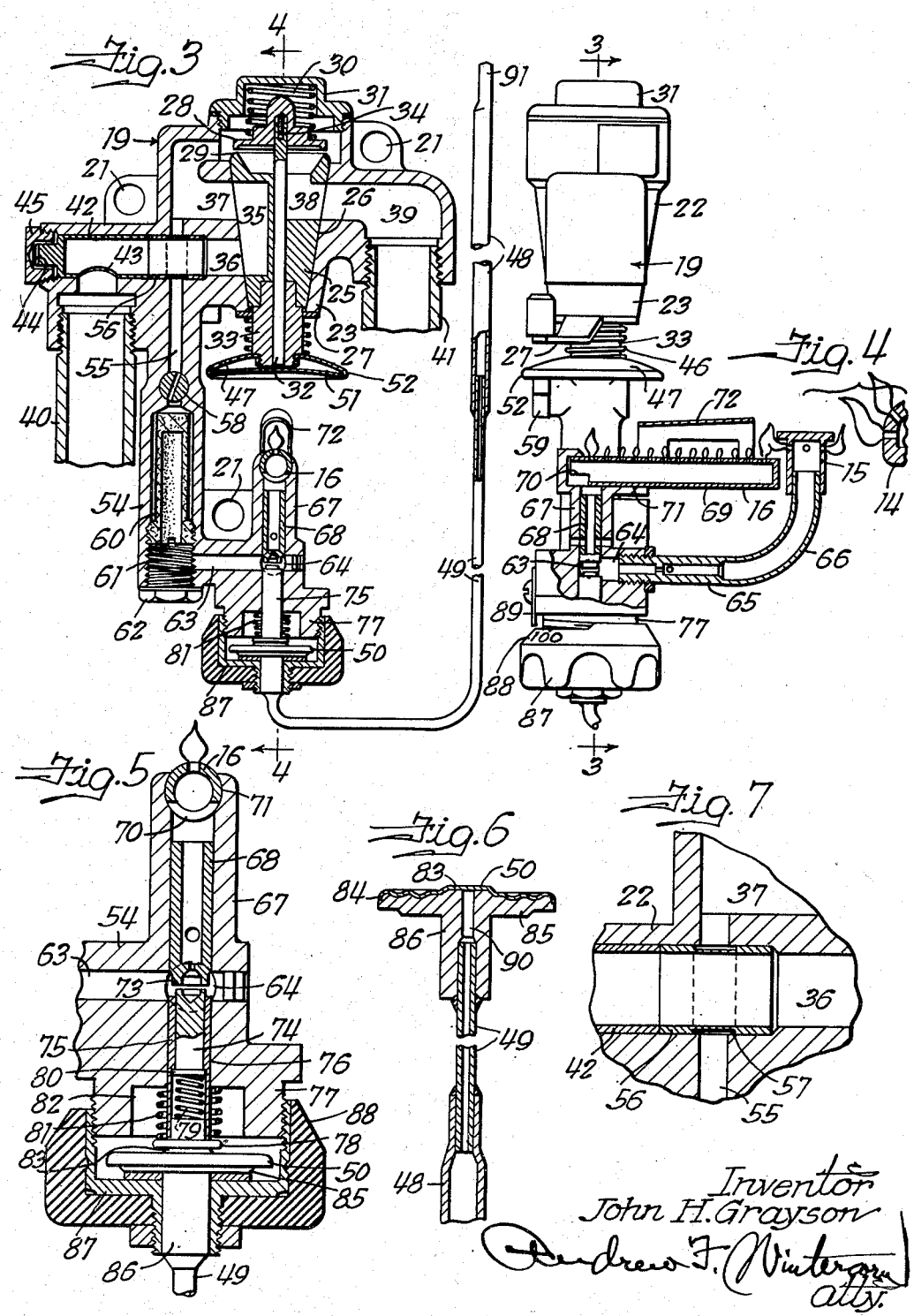

Patented May 22, 1951

2,553,575

UNITED STATES PATENT OFFICE 2,553,575

SAFETY PILOT CONTROLLED THERMOSTATIC GAS COCK

John H. Grayson, Monrovia, Calif., assignor, by mesne assignments, to Reconstruction Finance Corporation, Los Angeles, Calif., a corporation of the United States Application February 18, 1946, Serial No. 648,401

10 Claims. (Cl. 236—68)

This invention relates to a safety pilot controlled thermostatic gas cock especially designed and adapted for use with storage type water heaters but suitable for temperature control of various devices, such as space heaters, gas range ovens, and the like.

The principal object of my invention is to provide a heat control device operated by a thermostatically controlled pilot burner that is arranged to be ignited by a permanent or so-called stand-by pilot light.

A salient feature of this heat control consists in the provision of a snap-action thermostatic disk which is mounted preferably directly on the thermostatic gas cock for direct operation of the valve therein, said disk moving with snap-action to open the valve when heated by the thermostatically controlled pilot burner, thus providing the desired safety in operation, because if the stand-by pilot has been extinguished accidentally, the thermostatic pilot burner will not be lighted, and, consequently, the bi-metallic disk will not be heated to snap open the valve which controls the gas supply to the main burner. This novel combination also permits "outside lighting," because the disk can be snapped over center by finger pressure to admit gas to the pilot burner and when that is lighted the stand-by pilot is lighted from it, thus avoiding the difficulty and risk, too, of having to reach into the firebox to light a pilot burner that is hardly visible.

Another salient feature is the provision in a unitary assembly of a thermostatic gas cock, thermostatic pilot burner, and stand-by pilot burner.

Another important object of my invention is to provide a combined shut-off and thermostatic control in a single thermostatic gas cock in which a snap-action bi-metallic thermostatic disk is mounted on one end of the rotary "on" and "off" plug and is arranged to operate the stem of the valve that cooperates with a valve seat on the other end of said plug.

Still another object is to provide a heat control of the kind mentioned in which the thermostatically controlled pilot burner has the body thereof formed as an integral part of the body of the thermostatic gas cock, thus positively insuring the desired accuracy in the spaced relationship between the thermostatically controlled pilot burner and the snap-action disk that is to be heated thereby.

Other objects and advantages of my invention will appear in the course of the following description wherein reference is made to the accompanying drawings, in which—

Fig. 1 is a side view of a water heater equipped with a safety pilot controlled thermostatic gas cock made in accordance with my invention;

Fig. 2 is a sectional detail showing the method of applying the bulb of the thermostat to the outside of the heater tank, this section being taken on the line 2—2 of Fig. 1;

Fig. 3 is a vertical section through the safety pilot controlled thermostatic gas cock taken on the line 3—3 of Fig. 4;

Fig. 4 is a side view of Fig. 3 showing the thermostatically controlled pilot burner and stand-by pilot in section on the line 4—4 of Fig. 3, and Figs. 5, 6, and 7 are enlarged sectional details of certain portions of the structure shown in Figs. 3 and 4.

The same reference numerals are applied to corresponding parts throughout the views.

The present invention will be better understood and appreciated with the following brief discussion of the objections to prior heat controls:

Graduating type thermostats have been used as heat controls on storage type water heaters and these required a by-pass of gas to the main burner when the valve closed by thermostatic action, the reason being that the slow movement of the graduating thermostat would not open the valve quickly enough to deliver gas in sufficient quantity to the burner to ignite. If it were not for the by-passing of gas to the burner to maintain a low flame, the gradual slow turning on of the gas would result in a flash-back or back-fire, especially when manufactured gas having a high free hydrogen content was used. However, with good insulation and consequent small loss of heat by radiation, the gas by-passed to the burner resulted in heating the water far in excess of a desired temperature, sometimes to the boiling point, if water was not drawn frequently at the faucets, and furthermore, plumbers in installing such heaters were quite apt to be careless in the setting of the by-pass valve, usually figuring that it was better to have too much than too little gas flowing through the by-pass, in view of the likelihood of variation in gas pressure. As a result, service calls were necessarily frequent. With a snap-action valve like that contemplated by the present invention, there is no by-pass to the main burner but only to the stand-by pilot which requires a small fraction, usually about one-eighth, of the gas required in by-passing. Of course, the difficulty mentioned could be overcome by using a smaller main burner with a proportionately smaller by-pass, but this smaller minimum flow goes hand in hand with a smaller maximum flow, and hence, the water heater would be slow in temperature recovery, that is, it might require ninety minutes to reach a given temperature instead of thirty minutes. With the snap-action valve of my invention, it is possible to have a full maximum flow for quick recovery, without a proportionately higher minimum flow, because, in accordance with my invention, there is only the single small stand-by pilot light requiring the minimum flow.

During the recovery or heating period, a graduating type thermostat of the kind heretofore used, with a rating of 25,000 B. t. u., would reduce the B. t. u. input to say 18,000 when the water had reached a half-way point toward the desired temperature, and in the last 10° F., the input would drop to about 5,000 B. t. u. In other words, the thermostatically controlled heating would start strong from a cold start and finish weak, whereas with a snap-action valve like that contemplated by the present invention, the thermostatically controlled heating is always at the maximum rate of B. t. u. input regardless of the starting temperature of the water.

The graduating type thermostat used heretofore usually employed a valve arranged to be pushed open by a non-expanding rod working inside an expanding tube and, depending upon the coefficients of expansion, the valve would open about .002″ in a 20° drop in temperature. However, due to radiation loss, the valve would actually open about .0001″, thus forming a trap in the valve for minute foreign particles which sometimes built up until the valve could not close on its seat, and in such a siutation, the water would be heated to the boiling point and beyond, ruining the water meter, and unless the situation was remedied by a service call in time, the hot water would back up into the cold water line and fill flushing tanks and crack toilet bowls. A snap-action thermostat of the kind herein contemplated always opens to a minimum of .020″ which is many times the opening of the graduating type thermostat, thus permitting the minute foreign particles to pass through and be burned or mingled with the products of combustion.

The only advantage the graduating type thermostat had was that it assured a nearly uniform temperature of water, within about 5° F., this drop in temperature being due to radiation loss. On the other hand, the ordinary unimproved snap-action thermostat, due to its "load and fire" mechanism, had the objection that the temperature differential from hot to cold, due to radiation loss, was about 20° F. In order to reduce this temperature differential, the B. t. u. capacity of the burner could be reduced to a point where the snap-action member would have a graduating action instead of a snap-action, but graduating action would cause flash-back or back-fire, especially with manufactured gas having a high free hydrogen content.

It is therefore the principal object of the present invention to provide a snap-action thermostatic gas cock controlled by a thermostatic pilot burner so as to eliminate the only objection heretofore present in the ordinary unimproved snap-action thermostats, namely, the approximately 20° temperature differential, whereby to have all of the aforementioned advantages of a snap action thermostat, plus the one advantage mentioned for the graduating thermostat, to wit, uniform temperature of the water by thermostatic action.

Referring to the drawings, the reference numeral 8 designates a storage type water heater, the tank 9 of which is suitably insulated as indicated at 10. The fittings 11 and 12 are for intake of cold water and discharge of hot water, and 13 is the usual vent pipe for discharge of products of combustion from the main burner, indicated in dotted lines at 14, and also from the stand-by pilot burner 15 and thermostatic pilot burner 16 (see Fig. 4). A plate 17 suitably secured to the lower skirt portion of the tank as by screws 18 has the heat control of my invention indicated generally by the reference numeral 19 fastened thereto by screws 20 entered through the three holes 21 provided in webs at spaced points on the one-piece cast body 22. The burners 15 and 16, as clearly appears in Fig. 4, are assembled on the body 22 of the heat control 19 to form a unitary assembly with the thermostatic gas cock 23, the plate 17 carrying said assembly fitting in a cavity 24 provided therefor in the side of the heater which can be covered by a removable cover plate (not shown) for concealment of the heat control and generally improved appearance of the heater.

The thermostatic gas cock 23 is similar to that shown in my copending application, serial No. 629,592, filed November 19, 1945, now Patent No. 2,524,788, dated October 10, 1950, in so far as it includes a tapered plug 25 rotatable with a close working gas tight fit in an accurately machined tapered bore 26 provided in the body 22 and has a manually operable lever 27 connected thereto to turn the same to an "off" or "on" position, and includes also a valve disk 28 arranged to cooperate with a valve seat 29 provided on the large end of the plug 25, the valve 28 being normally urged toward the seat 29 by a coiled compression spring 30 that is seated in a closure plug 31 threaded into the body 22, as shown. A stem 32 slidable endwise in a bushing 33 inserted in the small end of the plug 25 has its inner end inserted in an axial bore in the valve 28 and is arranged to unseat the valve when the stem is given endwise movement in the manner hereinafter described, a screw 34 being threaded in the inner end of the stem 32, and being adjustable to vary the length of the stem as may be required for the proper operation of the valve 28. The plug 25 is arranged to be turned by means of the lever 27 to "on" position when the burner of the gas appliance, in this case the burner 14 of the water heater 8, is to be lighted. This places the port 35 in the plug in communication with passages 36 and 37 in the body, and also places the port 38 in the plug in communication with the passage 39 in the body so that, assuming the valve 28 is opened by thermostatic action, as later described, gas will flow from the supply pipe 40 through the body 22 and out to the burner 14 through the pipe 41. A sleeve valve 42 inserted with a close working fit in the enlarged outer end of the passage 36 has a radial port 43 communicating with the supply pipe 40 and has a screw driver slot 44 in the closed outer end thereof to permit turning the sleeve valve to a desired position permanently restricting the flow of gas to the burner accordingly as the gas pressure in any particular locality where the water heater happens to be installed may require. A plug 45 serving to close the outer end of the passage 36 conceals this sleeve valve. A coiled compression spring 46 that surrounds the bushing 33 and is seated at one end against the lever 27 and at the other end against a disk 47 suitably threaded in place on the outer end of the bushing, serves to hold the plug 25 seated under the desired slight amount of spring pressure for a good gas tight fit, without, however, giving rise to any distortion of the plug and consequent danger of gas leakage at the seat 29. The lever 27 is suitably held against turning with respect to the bushing 33, and, inasmuch as the bushing 33 is held against turning with respect to the plug 25, it follows that the plug may be turned by means of the lever from "on" to "off" position and vice versa. The fact that the plug 25, in addition to affording the seat 29 for the valve 28, forms the shut-off cock, eliminates the necessity for a separate gas cock, and hence, a proportionate saving in cost is realized, and the general construction is simplified and rendered far more compact.

In accordance with the present invention, the thermostatic pilot burner 16 is turned on and off gradually in response to the cooling and heating of an expanding fluid type thermostat consisting of a bulb 48, capillary tube 49 and an expansible diaphragm 50, the burner 16, when turned slowly on, serving to heat a bi-metallic disk 51 and causing it to snap over dead center from a normally concavo-convex form to the convexo-concave form illustrated in Fig. 3, in which it is shown holding the valve 28 open. The thermostatic pilot burner 16 therefore keeps the main burner 14 on full until the water in the tank 9 is heated to a predetermined temperature, whereupon the thermostat 48—50 shuts off the thermostatic pilot burner 16, and soon thereafter the snap action thermostatic disk 51 snaps back to its normal concavo-convex form, closing the valve 28 to the main burner 14. The thermostatic pilot burner 16 is lighted by the stand-by pilot burner 15, and then, after the heating up of the snap-action disk 51 to the point of snapping over dead center has caused the opening of the valve 28 and the delivery of gas to the main burner 14, the stand-by pilot burner 15 lights the main burner. The thermostatic pilot burner 16 obviously operates with a graduating action in response to the heating and cooling of the thermostat bulb 48, but so long as the disk 51 remains heated enough to keep the valve 28 open, the burner 14 operates at full B. t. u. rating, regardless of water temperature, thus making for quick recovery. The burner 16 may be of any suitable small B. t. u. rating, one that I have found suitable for the present purpose being of 500 B. t. u. rating. The present combination operates to give substantially uniform temperature of the water by virtue of the thermostatic action obtained, whereas the conventional rod and tube type operated with a temperature differential of about 20°, that is, the valve would be turned off automatically at 140° and on at 120°, which was never wholly desirable. Assuming the bulb 48 is immersed in the water, as it, of course, may be, the water heater 8 equipped with my heat control will operate with a 2°–3° temperature differential. With the outside mounting of the bulb 48, illustrated in Figs. 1 and 2, depending upon heat conduction through the wall of the tank and through the sheet copper housing 53, the temperature differential is only about 3°–4°, as compared to a temperature differential of about 20° obtained with the conventional rod and tube type thermostat immersed in the water, that type not being at all adaptable to such an outside mounting. The safety features of the present heat control are also very important. The thermostatic pilot burner 16 causes the snapping on and off of the valve 28 anywhere from ten to twenty-four times per day, and there is, therefore, less likelihood of the parts "freezing" in a given position, due to infrequent operation. Safety pilot valves of the kind heretofore used are set manually to operate automatically in the event the pilot light is accidentally extinguished, but the moving parts remain dormant for six months or a year or longer at a time, and during so long a period, corrosion and foreign matter collecting on and between the parts are quite apt to prevent the proper functioning of the device, and in that event, considerable gas is apt to escape with the possibilities of tragic results. On the other hand, with the present combination, if the stand-by pilot burner 15 should be accidentally extinguished, only 4% of the raw gas is liberated into the room or up the flue, because the other 96% is closed off due to the snap-action valve 28 which will not open unless the stand-by pilot 15 is on to ignite the thermostatic pilot burner 16. The snap-action disk 51 is supported circumferentially in the curled rim portion 52 of the cupped disk 47 and is disposed in substantially concentric relation to the plug 25 and stem 32 so that the rounded outer end of the stem has substantially point contact at the center of the disk 51 to open the valve 28 about .020" abruptly upon snap-action of the disk 51. It is also important to note that whereas a light coiled compression spring 30 is used to seat the valve 28, so as not to impose too much resistance to the snap-action of the bimetallic disk 51, there is no danger of leakage past the valve 28 when seated, because the full gas pressure is active against the back of the valve 28 tending to hold it closed. In other words, the valve is held closed by gas pressure plus spring pressure.

The bulb of the thermostat 48—50 is preferably inserted inside a sheet copper housing 53 that is soldered or otherwise suitably secured to the outside of the tank 9, thus permitting application or removal of the heat control 19 without emptying the tank. The outside installation of the thermostat also means a saving in the cost of the tank by eliminating the necessity for the conventional adapter which had to be welded or otherwise suitably fixed in the wall of the tank. Another advantage in the outside application is the fact that it eliminates any opportunity for electrolytic action between the water and the metal of the thermostat, and also avoids any possibility of any lime deposits on the thermostat.

The stand-by pilot burner 15 and the thermostatic pilot burner 16, in accordance with my invention, are supported on an integral L-shaped extension 54 of the body 22, whereby to positively locate the burner 16 accurately in a predetermined spaced relationship to the snap action disk 51 to be heated thereby, while at the same time insuring accurate location of the pilot burner 15 relative to the main burner 14 and also the thermostatic pilot burner 16. A passage 55 in the vertical leg of the L communicates with the passage 37 and intersects the passage 36, and for that reason, a sleeve 56 having an annular by-pass groove 57 in register with the passage 55 is inserted in the enlarged portion of the passage 36 in front of the sleeve 42, thus giving 100% shut-off with the one cock 25 when the lever 27 is turned to the "off" position. A turn cock 58 is provided in the passage 55 and arranged to be adjusted by turning the cock with a screw-driver to more or less permanently regulate the flow of gas to the burners 15 and 16, the adjustable end of the cock being suitably covered by a cap 59. 60 is a gas filter means which is threaded in the enlarged bore 61 provided in the lower end of the passage 55 and is accessible upon removal of the plug 62, for removal and cleaning. Any residue trapped by the filter plug will, of course, drop out by gravity when the plug 60 is removed, thus insuring greater safety in the operation of the heat control. The system of indirect gas passages in the valve body and valve plug serves also to trap dirt and thus protects all three burners against clogging. A horizontal passage 63 extends radially from the bore 61 in the lower portion of the extension 54 to deliver the filtered gas to the burners 15 and 16, and a branch 64 leads from the passage 63 and has a mixer 65 threaded therein for delivery of the filtered gas mixed with air admitted through the small orifices in the mixer 65 to the burner 15, said mixer terminating in an upwardly curved tube 66 on the upper end of which the stand-by pilot burner 15 is carried. An upwardly extending hollow neck 67 is provided on the lower end portion of the extension 54 and has a mixer tube 68 inserted therein to deliver filtered gas mixed with air admitted through the small orifices in mixer 68 to the thermostatic pilot burner 16, the latter comprising a tubular body 69 closed at one end and having the other end open and notched out, as indicated at 70, and inserted in a transverse bore 71 provided therefor in the upper end of the neck 67. A sheet metal shield 72 of inverted U-shape has its lower end suitably secured to the opposite sides of the burner 16 and serves to shield the burner from condensation. The mixer 68 has a valve seat 73 provided on the lower end thereof for cooperation with a valve 74 slidably mounted as a plunger in a sleeve 75 which in turn is slidable up and down in a vertical bore 76 provided in the enlarged lower end portion 77 of the extension 54. A plug 78 has a press fit in the enlarged bore in the lower end of the sleeve 75 and supports a coiled compression spring 79 bearing against the enlarged lower end 80 of the valve 74, whereby to permit seating the valve in a given upward movement of the sleeve 75 and thereafter compress the spring 79, which is caged under a preload pressure, to seat the valve under an increased spring pressure in further upward movement of the sleeve 75. A coiled compression spring 81 surrounding the lower end portion of the sleeve 75 in the recess 82 bears against the projecting rim portion of the plug 78 and tends normally to move the sleeve 75 downwardly so as to open the valve 74 when that is permitted by contraction of the diaphragm 50, as shown in Fig. 5. The diaphragm 50 expands under pressure of the volatile fluid with which the bulb 48 and capillary tube 49 are filled, and it is in the expansion of this diaphragm that the sleeve 75 is moved upwardly, the raised central portion 83 of the annularly corrugated circular diaphragm having contact with the plug 78 as shown in Fig. 5 to raise the sleeve 75 and the valve 74 with it in response to rise in temperature of the water in the tank. It is manifest that the burner 16 will have a graduating operation, the flame being gradually extinguished. It should also be clear that by adjusting the diaphragm 50 up or down, the critical temperature of the water may be accordingly lowered or raised. For that reason, the diaphragm 50, which is soldered or otherwise suitably secured at its flanged rim portion 84 onto a circular head 85 having an axial stem 86 depending therefrom, is supported in a screw threaded holder 87 that is threaded onto the lower portion 77 of the extension 54, the holder 87 having a beveled rim portion 88 on which are provided suitable temperature graduations which in the turning of the holder, move relative to a pointer 89 fixed on the extension 54. In that way, the consumer can easily adjust the heat control for a selected water temperature. The holder 87 will turn with respect to the stem 86, and the stem has one end portion of the capillary tube 49 inserted and soldered in place in an enlargement of an axial bore 90 provided therein. The other end of the tube 49 is entered and suitably soldered in place in one end of the bulb 48. After the air has been exhausted from this thermostat 48—50 and it has been filled with the volatile fluid through the outer end of the bulb 48, this end is sealed as indicated at 91. While I may, of course, use a multi-convoluted bellows in place of the single diaphragm 50, I have found that this diaphragm is entirely adequate for the present purposes, and it is obvious that it enables a much more compact construction.

It is believed the foregoing description conveys a good understanding of the objects and advantages of my invention. The appended claims have been drawn to cover all legitimate modifications and adaptations.

I claim:

1. In a thermostatic device of the character described, the combination of a valve arranged to be operated, a valve body therefor having inlet and outlet openings, a seat member for said valve rotatably mounted in said body and having inlet and outlet ports arranged to communicate with the aforesaid inlet and outlet openings, said seat member being tapered and having the valve seat on its large end defining the end of a longitudinal passage provided in said seat member communicating with one of the aforesaid ports in said seat member, manually operable means attached to the small end for turning said valve seat member to on and off positions, a valve operating stem extending axially through and guided in said valve seat member for reciprocatory movement, said valve seat member being rotatable on the axis of said stem, spring means urging said valve and stem in one direction, and a bimetallic snap-action thermostatic disc disposed in substantially concentric relation to said stem and carried at its outer edge on a support provided therefor on the small end of said valve seat member and arranged to move said valve abruptly in the opposite direction by means of said stem against the resistance of said spring means upon a predetermined change in temperature of said disc.

2. In a thermostatic device of the character described, the combination of a valve arranged to be operated, a valve body therefor having inlet and outlet openings, a tapered plug member rotatable in a tapered bore in said valve body and having the valve seat on its large end defining the end of a longitudinal passage provided in said plug communicating with one of two radial ports provided therein that are arranged to communicate with the aforesaid inlet and outlet openings, manually operable means for turning said plug to on and off positions, spring means normally tending to close said valve, said plug having an axial extension on the small end projecting from said body to which the aforesaid manually operable means is attached, a cupped disk mounted on said axial extension in substantially concentric relation to said plug and having a rim portion, a bimetallic snap-action disk mounted peripherally in the rim portion of said cupped disk and normally bulged away from said axial extension but adapted when heated to bulge abruptly toward said axial extension, and a stem for operating said valve slidable endwise in said plug and arranged to be engaged at its outer end by said snap-action disk and moved endwise in the snap-action thereof when the same is heated, whereby to open said valve in response to heating of said snap-action disk.

3. A thermostatic valve body having a bore, a shut-off plug rotatably received in said bore, a gas passage provided in the said rotatable plug connecting with gas passages provided in said body, a valve seat on one end of the said rotatable plug, a valve for engaging said valve seat, a snap-action heat responsive means at the opposite end of the said rotatable plug, a rod extending lengthwise through the plug from the snap-action means to operate said valve, and a thermostatically operated pilot burner for providing intermittent heat to the said snap-action heat responsive means to operate the latter according to temperature changes of a heating or cooking appliance.

4. A thermostatic valve body having a bore, a shut-off plug rotatably received in said bore, a gas passage provided in the said rotatable plug connecting with gas passages provided in said body, a valve seat on one end of the said rotatable plug, a valve for engaging said valve seat, a snap-action heat responsive means at the opposite end of the said rotatable plug, a rod extending lengthwise through the plug from the snap action means to operate said valve, a thermostatically operated pilot burner for providing intermittent heat to the said snap-action heat responsive means to operate the latter according to temperature changes of a heating or cooking appliance, a main burner for the appliance, and a standby pilot burner for lighting said main burner and said thermostatically operated pilot burner, said valve body having an extension forming a support for said standby pilot burner and said thermostatically operated pilot burner, said extension having a gas passage therein for conducting fuel to said stand-by pilot burner and said thermostatically operated pilot burner.

5. A thermostatic valve body having a bore, a shut-off plug rotatably received in said bore, a gas passage provided in the said rotatable plug connecting with gas passages provided in said body, a valve seat on one end of the said rotatable plug, a valve for engaging said valve seat, a snap-action heat responsive means at the opposite end of the said rotatable plug, a rod extending lengthwise through the plug from the snap action means to operate said valve, a thermostatically operated pilot burner for providing intermittent heat to the said snap-action heat responsive means to operate the latter according to temperature changes of a heating or cooking appliance, a main burner for the appliance, a standby pilot burner for lighting said main burner and said thermostatically operated pilot burner, said valve body having an extension forming a support for said standby pilot burner and said thermostatically operated pilot burner, said extension having a gas passage therein for conducting fuel to said standby pilot burner and said thermostatically operated pilot burner, and a single cock in said passage for regulating flow of gas to both of said last named burners.

6. A thermostatic valve body having a bore, a shut-off plug rotatably received in said bore, a gas passage provided in the said rotatable plug connecting with gas passages provided in said body, a valve seat on one end of the said rotatable plug, a valve for engaging said valve seat, a snap-action heat responsive means at the opposite end of the said rotatable plug, a rod extending lengthwise through the plug from the snap action means to operate said valve, a thermostatically operated pilot burner for providing intermittent heat to the said snap-action heat responsive means to operate the latter according to temperature changes of a heating or cooking appliance, a main burner for the appliance, a standby pilot burner for lighting said main burner and said thermostatically operated pilot burner, said valve body having an extension forming a support for said standby pilot burner and said thermostatically operated pilot burner, said extension having a gas passage therein for conducting fuel to said standby pilot burner and said thermostatically operated pilot burner, and a filter housed in said extension for filtering the gas flowing through said passage to said last named burners.

7. A thermostatic valve body having a bore, a shut-off plug rotatably received in said bore, a gas passage provided in the said rotatable plug connecting with gas passages provided in said body, a valve seat on one end of the said rotatable plug, a valve for engaging said valve seat, a heat responsive means at the opposite end of the said rotatable plug arranged to operate said valve, a thermostatically operated pilot burner for providing intermittent heat to the said heat responsive means according to temperature changes of a heating or cooking appliance, a main burner for the appliance to which gas is delivered from said valve body when the valve is unseated and the plug is in open position, a standby pilot burner for lighting said main burner and said thermostatically operated pilot burner, said valve body having an extension forming a support for said standby pilot burner and said thermostatically operated pilot burner, said extension having a gas passage therein for flow of a small amount of gas to said stand-by burner and said thermostatically operated pilot burner, said passage in said extension including a substantially vertical portion and a lower transversely extending portion leading to said last named burners, a closure plug removable from said extension at the bottom of said vertical passage, and a cylindrical filter plug vertically disposed in and removable from the bottom portion of said vertical passage upon removal of said closure plug and serving to filter the gas flowing to said last named burners, said filter plug closing said vertical passage above the point of communication with the transverse passage and being throughout most of its length of smaller external diameter than that portion of said vertical passage containing said plug.

8. In a thermostatic device of the character described, the combination of a valve body having inlet and outlet openings, a tapered plug member rotatable in a tapered bore in said valve body having a valve seat on its large end defining the end of a passage provided in said plug, the passage communicating with one of two radial ports provided in said plug that are adapted to communicate with the inlet and outlet openings, manually operable means for turning said plug to "on" and "off" positions, a valve element arranged to engage the valve seat on the large end of said plug to close the passage provided in said plug, a light spring tending to seat said valve element, said valve element being also held seated under gas pressure, whereby also to hold the tapered plug seated in the tapered bore under gas pressure, spring means active on the small end of said plug in a seating direction, a valve operating stem extending axially through and guided in said plug for reciprocatory movement, and a bimetallic snap-action thermostatic disk supported peripherally on a support provided therefor on the small end of said plug and arranged to operate said stem to open the valve against the resistance of said light spring with snap-action upon a predetermined change in temperature of the disk.

9. A device as set forth in claim 7, including a single cock in the vertical portion of the passage in said extension for regulating the flow of gas to the two pilot burners.

10. A device as set forth in claim 7, wherein the thermostatically operated pilot burner includes a valve for controlling the flow of gas from the transverse portion of the passage in said extension to said burner, the device including a graduating type thermostat responsive to temperature changes of the heating or cooking appliance for operating said valve.

JOHN H. GRAYSON.

REFERENCES CITED

The following references are of record in the file of this patent:

UNITED STATES PATENTS

| Number | Name | Date |
| --- | --- | --- |
| 424,617 | Powers | Apr. 1, 1890 |
| 926,194 | Junkers | June 29, 1909 |
| 1,001,997 | Scott | Aug. 29, 1911 |
| 1,612,532 | Peters | Dec. 28, 1926 |
| 1,683,213 | TePas | Sept. 4, 1928 |
| 1,757,591 | Root | May 6, 1930 |
| 1,773,698 | Spencer | Aug. 19, 1930 |
| 1,842,335 | TePas | Jan. 19, 1932 |
| 2,008,400 | Mott | July 16, 1935 |
| 2,302,407 | Waddell | Nov. 17, 1942 |
| 2,303,128 | Koppel | Nov. 24, 1942 |
| 2,422,368 | Ray | June 17, 1947 |

FOREIGN PATENTS

| Number | Country | Date |
| --- | --- | --- |
| 942 | Great Britain | A. D. 1904 |